United States Patent
Clements et al.

(10) Patent No.: US 7,460,602 B2
(45) Date of Patent: Dec. 2, 2008

(54) METHOD FOR PERFORMING HIGH SPEED SERIAL LINK OUTPUT STAGE HAVING SELF ADAPTATION FOR VARIOUS IMPAIRMENTS

(75) Inventors: Steven M. Clements, Raleigh, NC (US); Carrie E. Cox, Cary, NC (US); Hayden C. Cranford, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 11/119,505

(22) Filed: Apr. 29, 2005

(65) Prior Publication Data
US 2006/0245507 A1    Nov. 2, 2006

(51) Int. Cl.
*H04B 3/00* (2006.01)
(52) U.S. Cl. .................. 375/257; 375/219; 375/229; 375/220; 375/295; 375/316; 398/135; 398/137; 398/195
(58) Field of Classification Search .......... 375/224, 375/229, 257, 286, 295, 316, 319, 146, 226; 327/155, 551–552; 333/18, 20, 28; 398/135, 398/137, 195; 702/69, 85, 89
See application file for complete search history.

(56) References Cited

U.S. PATENT DOCUMENTS

| | | | |
|---|---|---|---|
| 3,714,499 A | 1/1973 | Pelta et al. ................ 315/22 |
| 5,361,175 A | 11/1994 | Richardson et al. .......... 360/46 |
| 5,471,134 A | 11/1995 | Oudille et al. ........... 324/103 P |
| 5,486,769 A | 1/1996 | Chim et al. ................. 324/751 |
| 5,572,104 A | 11/1996 | Nold et al. .................. 318/672 |
| 6,429,696 B1 | 8/2002 | Kao et al. ..................... 327/58 |
| 6,819,166 B1 * | 11/2004 | Choi et al. .................. 327/551 |
| 6,995,627 B2 * | 2/2006 | Casper et al. ................. 333/18 |
| 7,215,891 B1 * | 5/2007 | Chiang et al. ............... 398/137 |
| 7,239,971 B2 * | 7/2007 | Miller ......................... 702/89 |
| 7,376,199 B1 * | 5/2008 | Nix ............................ 375/295 |
| 2005/0281343 A1 * | 12/2005 | Hsu et al. .................... 375/257 |

* cited by examiner

*Primary Examiner*—Shuwang Liu
*Assistant Examiner*—Hirdepal Singh
(74) *Attorney, Agent, or Firm*—Joscelyn G. Cockburn; Patrick J. Daugherty; Driggs, Hogg, Daugherty & Del Zoppo Co., LPA

(57) ABSTRACT

A high speed serial link method is provided, using a data driver and a replica driver structure, the replica driver structure comprising a replica driver, a calibration engine and a peak level detector. The calibration engine compares a peak level detector output to a reference value and responsively performs a data driver adjustment, wherein the data driver adjustment comprises at least one of a driver biasing adjustment, a driver intermediate stage bandwidth adjustment and a driver equalization setting adjustment. In some embodiments, the calibration engine incorporates a comparator and a digital state machine; in other embodiments, it incorporates an analog operational amplifier.

7 Claims, 6 Drawing Sheets

METHOD FOR PERFORMING HIGH SPEED SERIAL LINK OUTPUT STAGE HAVING SELF ADAPTATION FOR VARIOUS IMPAIRMENTS

FIELD OF THE INVENTION

Data signal transmission in communication systems and, more particularly, high-speed serial link driver components for the transmitting of data signals across communication media, including backplane link environments.

BACKGROUND OF THE INVENTION

Communication systems require drivers to transmit signals across communication media. Often the output signal of the driver is required to be a set amplitude as the communication media is lossy and will attenuate the transmitted signal. The signal at the far-end of the communication media must be large enough to be interpreted by the receiver with no error.

Many communication standards for high-speed serial link components require absolute minimum and maximum output amplitudes. Standards addressing high speeds are often stringent, requiring relatively accurate driver output amplitude. Furthermore, output amplitude is usually addressed after connectors and packaging, which impose frequency-dependent signal attenuation. Package and connector loss can easily approach 20%-30% at high data rates. However, the loss is variable due to various package types or chip placement in a given package. Consequently, one driver output amplitude will not necessarily meet the requirements across various packages and connectors.

Since package and connector loss can be significant at high data rates, ISI (intersymbol interference) is introduced. ISI is the phenomenon where relatively low-frequency data is superimposed onto high-frequency data such that the data transmitted at the different data rates are not well-defined pulses at the system output. Data recovery becomes more difficult and error-prone when ISI is present in the system. Timing jitter is also introduced by ISI.

Many drivers utilize FIR filters to implement signal equalization to combat ISI. Equalization is an approach where the low-frequency energy components are decreased relative to the high-frequency energy components of the transmitted data in a bandlimited system. Low-frequency data is attenuated relative to the signaling Nyquist frequency, thus flattening the overall system response and removing ISI. The most common approach to driver equalization is pre-emphasis, where the high-frequency data amplitude is increased whenever a bit transition occurs. Pre-emphasis is implemented with an FIR filter such that weighted past data is subtracted from the present transmitted data.

Communication systems require a set amount of equalization to ensure ISI is limited at the receiver. Also, some standards require a minimum and maximum amount of transmitter equalization prior to the communication media. However, achieving accurate equalization for all possible packages is difficult due to variable package and connector loss.

Prior art driver/FIR systems and methods may set output levels based on biasing alone. However, biasing solutions have limited performance possibilities. Required nominal value outputs set by biasing alone may not meet minimum values required due to signal attenuation. Moreover, biasing errors within a range of plus or minus 1 to 20 percent are common. The combination of the bias tolerance and signal attenuation results in a composite error violating specifications.

Package and connector loss is detrimental in high speed serial link applications given the tight voltage swing and equalization limits required. What is needed is a method and system for performing effective equalization at very high performance with very low cost in area and power in high speed serial link applications and, in particular, in the backplane link environment.

SUMMARY OF THE INVENTION

A high speed serial link method is provided, using a data driver and a replica driver structure, the replica driver structure comprising a replica driver, a calibration engine and a peak level detector. The calibration engine compares a peak level detector output to a reference value and responsively performs a data driver adjustment, wherein the data driver adjustment comprises at least one of a driver biasing adjustment, a driver intermediate stage bandwidth adjustment and a driver equalization setting adjustment. In some embodiments, the calibration engine incorporates a comparator and a digital state machine; in other embodiments, it incorporates an analog operational amplifier.

DESCRIPTION OF THE PREFERRED EMBODIMENTS

The present invention provides for a high speed serial link with a per-chip replica calibration scheme. The calibration scheme provides for accurate output amplitude, equalization setting, and consequently reduced ISI. Comparison of actual output amplitude and required values is performed and adjustments are made to (1) driver biasing, (2) intermediate stage bandwidth, and (3) equalization setting. These adjustments can be made in any combination.

Figure 1:
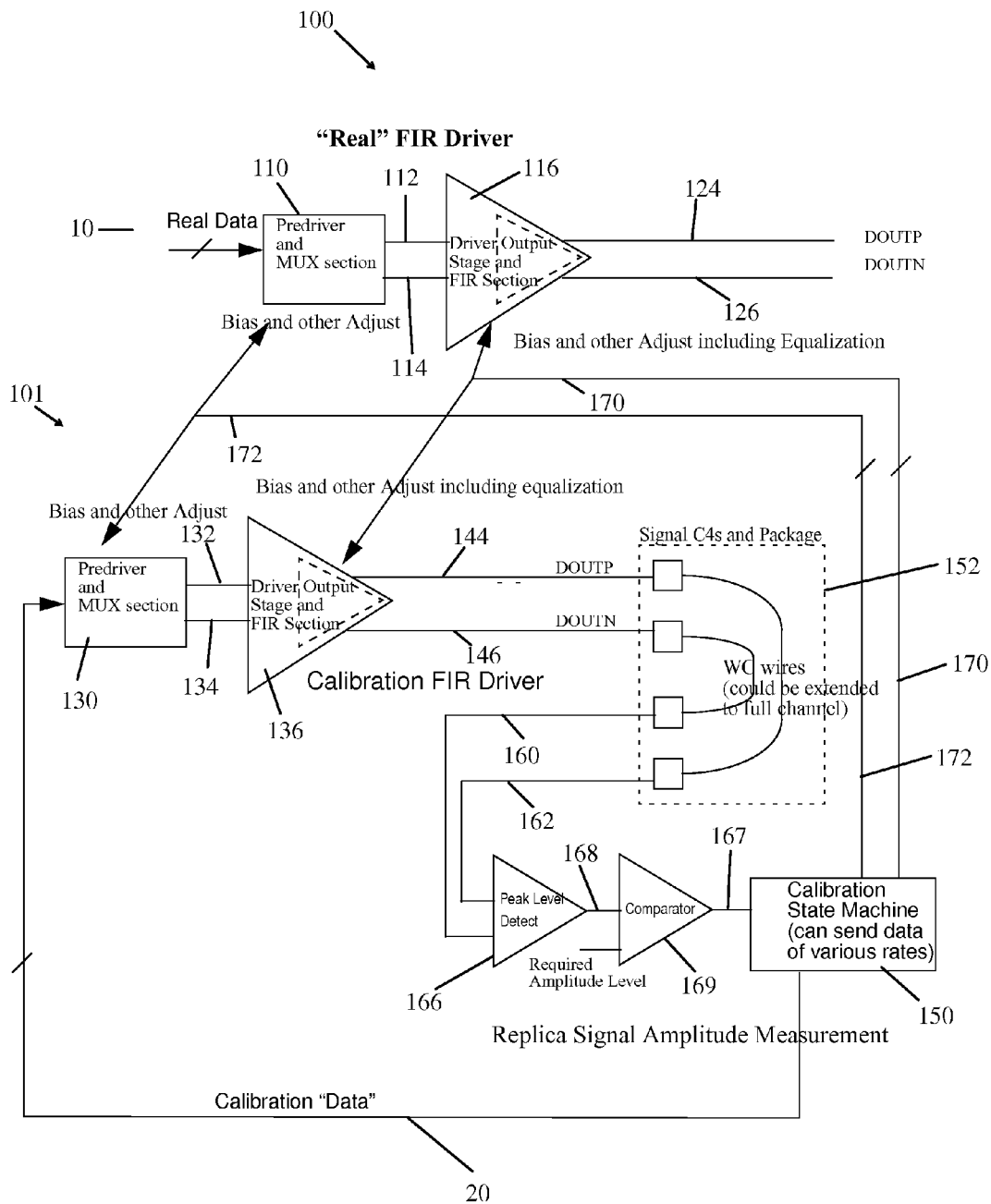
FIG. 1 is a schematic block illustration of a driver/FIR serial link according to the present invention.

Referring now to FIG. 1, a driver/FIR serial link 100 according to the present invention is illustrated. A real data signal 10 enters the serial link 100 at a predriver and mux 110. As is well known in the art, the mux 110 processes the real data input and generates a mux data out positive signal 112 and a mux data out negative signal 114 to a driver element 116. The driver 116 in turn generates the data out positive signal 124 and the data out negative signal 126 to the next interfaced component on the chip, or to another coprocessor or to any other remote device through the network processing system, as is well known in the art.

What is new is that bias, equalization, bandwidth and other adjustments are provided to the predriver and mux component 110 and the data driver 116 by a novel calibration engine structure 101 which includes a "replica" predriver and mux section 130 and a "replica" data driver 136.

The replica predriver and mux 130 receives the calibration data signal 20 from a calibration state machine component 150. The replica mux 130 responsively generates a replica mux data out positive signal 132 and a replica mux data out negative signal 134 to the replica driver element 136. The replica driver 136 in turn generates replica data out positive signal 144 and replica data out negative signal 146 to C4 signal interface 152.

The C4 signal interface 152 may be any conventional C4 interface, such as a CBGA, a backplane or card environment, or any other media appropriate to transfer data through C4 structures. The C4 signal interface 152 responsively outputs a positive C4 data output signal 160 and a negative C4 data output signal 162, to a peak level detector 166. The peak level detector 166 responsively sends the detected level output 168 to a comparator 169, where the detected level is compared to an ideal reference level. The digital result 167 of the comparison is processed by the calibration state machine 150.

The calibration state machine 150 in turn responsively sends a driver adjustment information signal 170 to the driver 116 and the replica driver 136, and a predriver and mux adjustment information signal 172 to the predriver and mux 110 and the replica predriver and mux 130. Adjustments are then made to the predriver and mux 110 and replica predriver and mux 130, and biasing, intermediate stage bandwidth and equalization adjustments are responsively made to the driver 116 and replica driver 136.

The present invention examines results from the peak level detector 166 for several calibrated data frequencies. The measured output amplitude indicated by the level detector is compared to the required minimum amplitude. This comparison can be made over many calibrated data frequencies such that the required amplitude adjustment is found for each of the calibrated data frequencies. Adjustments are made through the adjustment signals 170 and 172. Through bias adjustment and/or intermediate stage bandwidth, the minimum output amplitude is achieved. Additionally, the output amplitude is equalized where the lower-frequency output amplitude is reduced relative to the higher-frequency output amplitude to reduce ISI. Using one reverse communication channel, the present invention can automatically equalize both package and channel through the driver adjustment information signal 170 and the predriver and mux adjustment information signal 172.

According to the present invention, the calibration engine structure 101 performs comparison operations on signal characteristics to expected values, and adjustments are made to (1) driver biasing, (2) intermediate stage bandwidth, and/or (3) equalization.

Driver biasing. Two factors determine the biasing of a driver—the desired output voltage swing and the driver load. Assuming matched loading and assuming the driver load is dominated by the lumped wiring and package capacitance, the differential peak to peak driver voltage swing (V) is defined by V=IR/(1+sRC), where I is the bias current, C is the driver load (total load capacitance of the driver), and R is the system resistance. Bandwidth limitation and subsequent ISI can be introduced into the driver output signal due to the system resistance and the driver load capacitance for a given driver output amplitude.

Intermediate stage bandwidth. When an electrical signal is bandlimited, the bandlimited signal experiences ISI and increased timing jitter for a random data stream. ISI can be introduced in the predriver and can be eliminated by increasing the predriver drive strength.

Equalization. Generally, equalization is used to combat ISI and jitter due to bandwidth limitation. The amount of equalization required to overcome bandwidth limitation is determined by the driver output impedance at a given data rate. This characteristic varies over process (responsive to factors such as sheet resistance, wiring capacitance, diffusion capacitance, etc.), packaging, and channel loss. For an ASIC part, the packaging and channel are at the customer's discretion and can vary significantly. Thus, the amount of required equalization is unknown until the hardware is in hand.

What is new is that to avoid hand calibration for a part within a given package and communication channel, the amount of equalization can be determined directly on the chip structure by incorporating the components provided by the present invention. The driver swing is measured into the package terminated by the characteristic impedance (for example, 100 Ohms in a 50 Ohms differential system) on the module or through another set of package pins.

Figure 2:
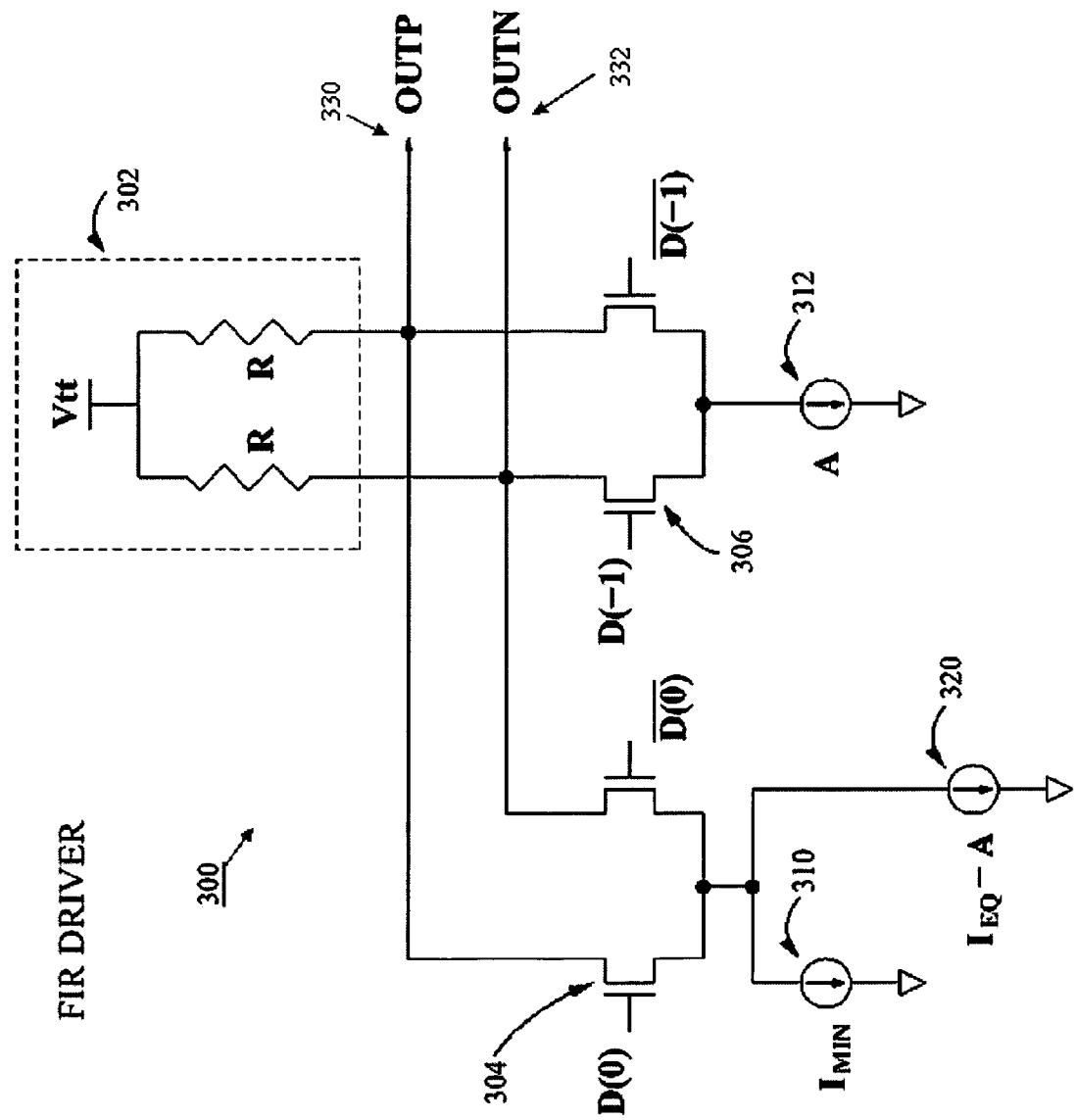
FIG. 2 is a schematic block illustration of an adjustable FIR driver component according to the present invention.

FIG. 2 provides an illustrative embodiment of an adjustable 2-tap FIR driver 300 appropriate for use as driver component 116 and replica driver component 136. The embodiment is a 2-tap, current-mode FIR driver, although it will be readily apparent to one skilled in the art that other transmitter structures may be utilized in the present invention. D(0) is the present data and D(−1) is the present data delayed by one bit time. Output-swing and equalization adjustment are accomplished through the present invention by calibration settings to constant current source components C 310, C 312, and C 320. Constant current source 310 has value $I_{min}$, constant current source C 320 has value $I_{eq}$−A, and constant current source C 312 has value A. The value A is in the range [0, $I_{eq}$]. $I_{min}+I_{eq}$ is the maximum amount of output current possible. The value A sets the equalization power, which is the output amplitude reduction relative to the maximum output amplitude given no signal attenuation. MOS differential pairs 304 and 306 are provided as switches driven by differential versions of the mux data positive signal 112 and mux data negative signal 114 as implemented in the driver component 116, or by replica mux data positive signal 132 and replica mux data negative signal 134 as implemented in the replica driver component 136. Although this embodiment provides for two MOS transistors, alternative embodiments may incorporate as few as one, and other embodiments incorporate seven or eight. As is readily apparent to one skilled in the art, the number of MOS transistors is not crucial to carrying out the objects of the present invention, and it is to be understood that the present invention is not limited to the specific MOS devices or numbers of devices described in exemplary embodiments.

MOS differential pair 304 steers a sum of the currents $I_{min}+(I_{eq}-A)$ to the positive output node OUTP 330 when D(0) is '1'. MOS differential pair 304 steers a sum of the currents $I_{min}+(I_{eq}-A)$ to the negative output node OUTN 332 when D(0) is '0'. MOS differential pair 306 steers current A to OUTP 330 when D(−1) is '0'. MOS differential pair 306 steers current A to OUTN 332 when D(−1) is '1'. After D(0) transitions from a '0' to a '1', D(−1) is the old value of D(0), '0'. Assuming D(0) transitions to '1' and D(−1) is '0', steady-state network analysis yields OUTP=VTT−($I_{min}+I_{eq}$)*R and OUTN=VTT. The differential output voltage, OUTP−OUTN, is the maximum driver output voltage attainable, ignoring bandwidth limitation effects. Bandwidth limitation will determine how quickly this output voltage level is attained and, thus, the output voltage level for the maximum data frequency. The sum of the current sources $I_{min}$ and $I_{eq}$ can be adjusted to achieve the required minimum output amplitude through biasing or programmable current selection.

After one bit time has passed, D(0) remains a '1' and D(−1) transitions to a '1'. Steady-state network analysis yields, OUTP=VTT−($I_{min}+(I_{eq}-A)$)*R and OUTN=VTT−A*R. The output voltage, OUTP−OUTN, has been reduced by −2AR. Thus, the low-frequency data amplitude has been reduced relative to the steady-state output amplitude by −2AR. Thus, adjusting equalization can be accomplished by changing the value A in this particular implementation.

Figure 3:
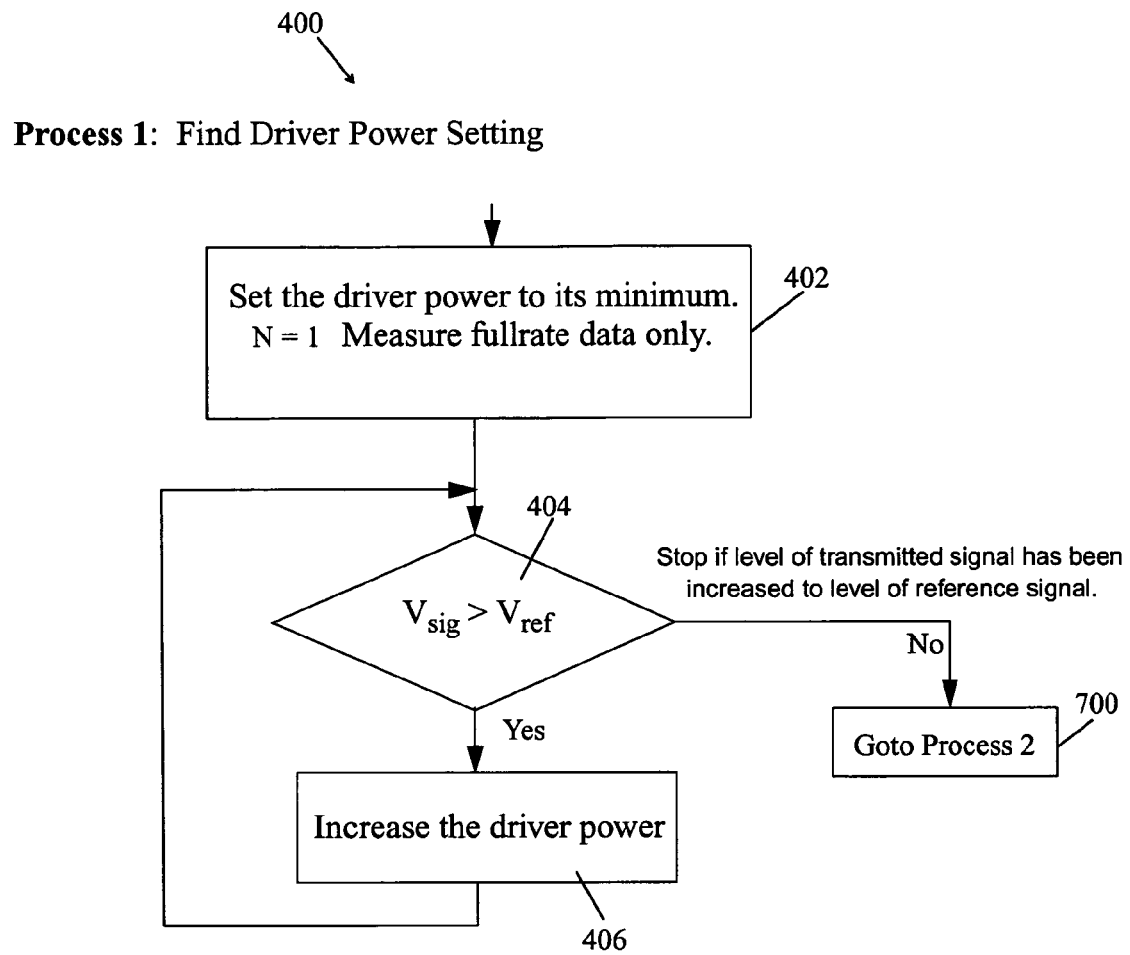
FIG. 3 is a flow chart illustration of a driver power setting according to the present invention.

The driver power setting corresponding to the desired driver amplitude varies significantly for a given application and is set according to the driver power setting process 400 illustrated in the flow chart shown in FIG. 3. The flow chart is representative of the state machine of FIG. 1 and FIG. 4. The flow chart also applies to the analog feedback loop of FIG. 5. For this process, the replica driver of the invention is configured such that the driver is transmitting data for bit time 0. Referring to FIG. 2, D(0) will always be the opposite sense of D(−1) for this process. Initially, in step 402, the driver replica is set to its minimum output amplitude via various driver aspects, and the input of the driver replica is set to the maximum frequency. In step 402, the driver replica output amplitude, $V_{sig}$, is compared to a reference signal amplitude, $V_{ref}$. The reference signal amplitude is set to the minimum amplitude required for the desired application. If the output amplitude is less than the reference amplitude, the driver power is increased in step 406. When the output amplitude is at least equal to the reference amplitude, then the driver power setting process 400 is complete and the driver equalization setting process 700 illustrated in FIG. 6 initiates, which is described below. The minimum driver amplitude at the maximum data rate is dependent on bandwidth limitation, which varies over process (wiring capacitance, sheet resistance, device gain and capacitance, etc . . . ) and is directly related to the driver load (the package). The specific implementation can take many embodiments.

Figure 4:
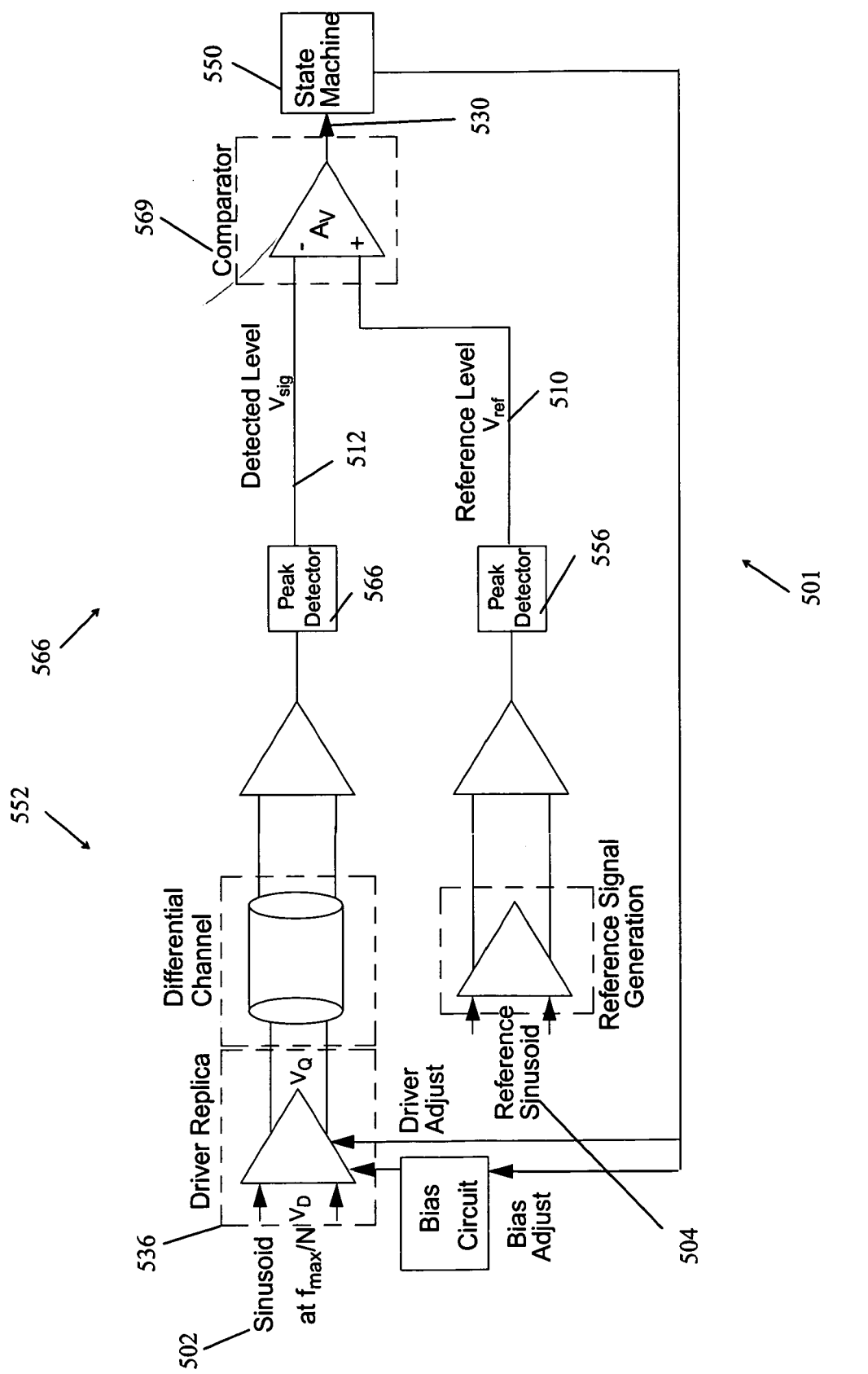
FIG. 4 is a schematic block illustration of a digital calibration engine structure according to the present invention.

Referring now to FIG. 4, an exemplary digital calibration engine structure 501 according to the present invention is illustrated. The digital calibration engine structure 501 is a circuit implementation where calibration data input sinusoids 502 of different frequencies are measured relative to a reference signal 504. The sinusoids 502 are the signals under test in this circuit. The measured sinusoids 502 have frequency $f_{max}/N$, where $f_{max}$ is the maximum frequency of interest and N is an integer greater than one. The maximum value of N is determined by the slowest frequency of interest in the system. A peak level detector 566 detects the peak value of both the reference signal 504 and the signal under test 502. The peak value of a signal is indicative of the amplitude of a signal. The reference signal peak value 510 and the signal under test peak value 512 are compared by the comparator 569. The comparison output 530 is interpreted by a digital state machine 550, which in turn adjusts various replica driver characteristics. For instance, output stage and/or predriver biasing could be adjusted, consequently increasing the bandwidth and amplitude of a driver output and/or predriver output. Furthermore, the number of circuits in parallel driving the output stage could be adjusted. If more predriver circuits are allowed to drive the output stage, the bandwidth of the predriver increases. Driver output amplitude could also be increased by adding more current in parallel in a CML driver output stage current source. The state machine 550 makes adjustments to the replica driver 530 until the reference 504 and the signal under test 502 for a given frequency are the same. The adjustments applied to the replica driver 530 would then be applied to a driver (such as the predriver/MUX 110 and driver output stage 116 structure) used in normal communication.

Figure 5:
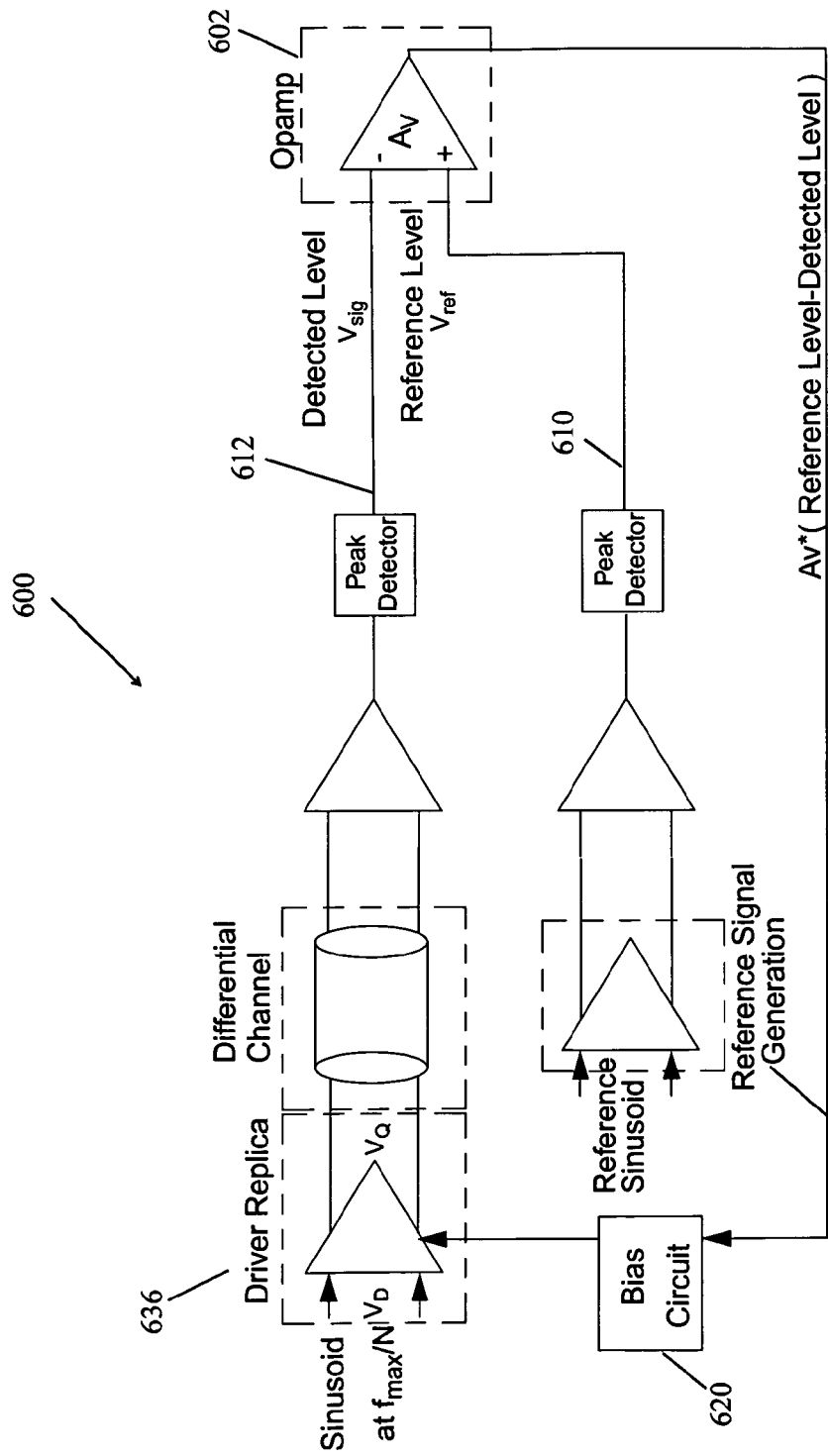
FIG. 5 is a schematic block illustration of an analog feedback loop according to the present invention.

In another embodiment of the present invention, output-level adjustment is alternatively made in an analog fashion with the feedback loop structure 600 illustrated in FIG. 5, wherein a detected output level 612 is compared to a required output level 610 continuously through an operational amplifier 602. The feedback system forces the driver replica 636 bias to change through a bias circuit component 620 such that the detected output level 612 will be equal to the reference signal generation circuit output level 620. This adjusted bias would be shared with the driver (not shown) that is used in normal communication. This implementation is limited as only the bias can be adjusted versus other driver characteristics. However, this approach could be used in combination with a digital approach for more flexibility.

Figure 6:
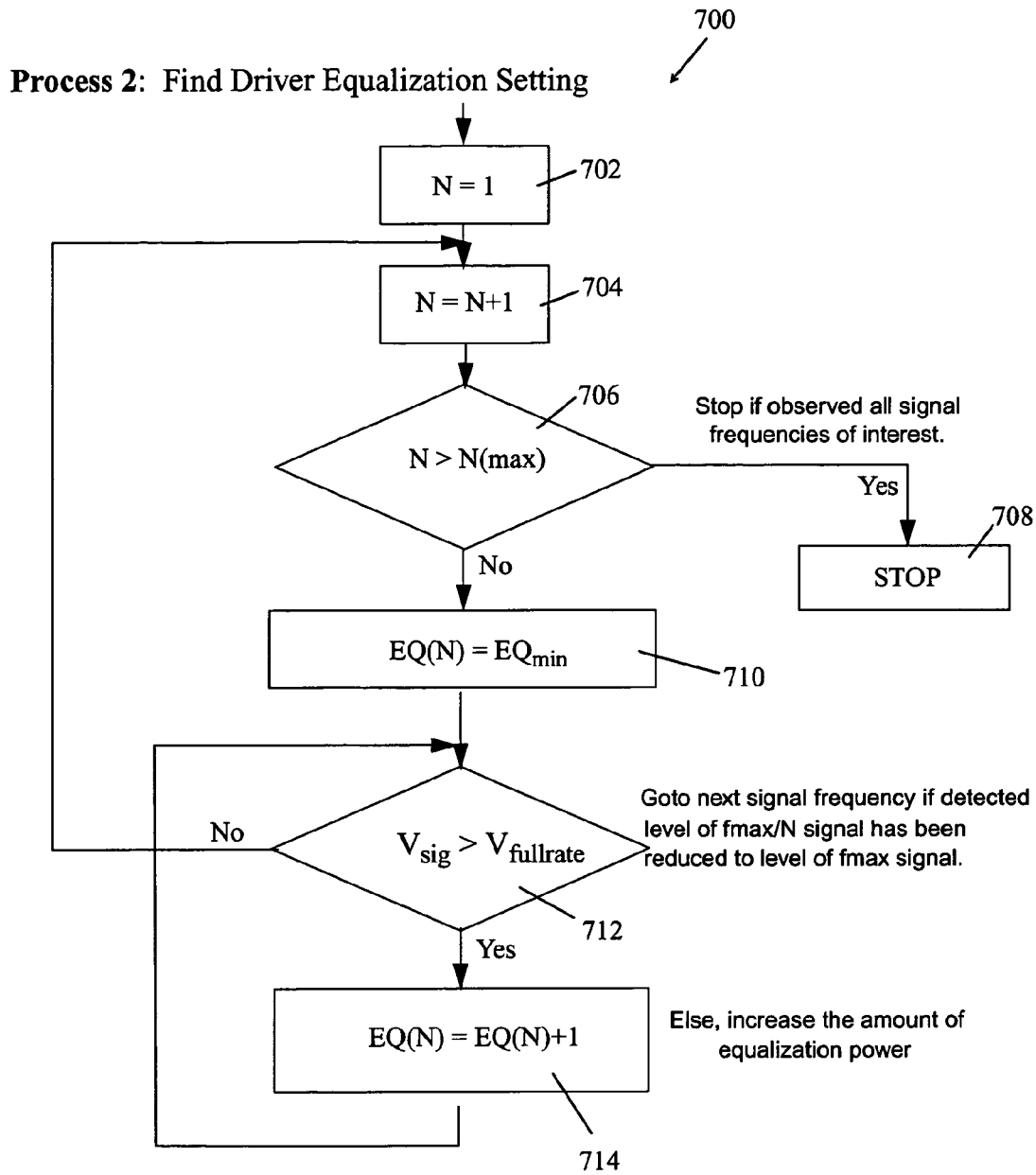
FIG. 6 is a flowchart illustration of an equalization setting process according to the present invention.

Equalization is used according to the present invention to combat ISI and jitter due to bandwidth limitation. Furthermore, equalization is also used to overcome the loss in the communication channel after the package. The process used to determine the required driver characteristics necessary for a specified driver output amplitude can be applied to find the amount of equalization to overcome bandwidth limitation due to the driver itself and the package and possibly the entire communication channel. FIG. 6 is a flow chart illustration of a method 700 according to the present invention to reduce the driver replica output voltage swing for low-frequency data until low-frequency data amplitude is the same as maximum frequency data amplitude. The flow chart is representative of the state machine of FIG. 1 and FIG. 4.

To set the appropriate amount of driver equalization, the driver output amplitude at maximum data frequency is compared to the output amplitude of low-frequency data. The amount of equalization can be set for an n-tap FIR filter by applying the process of FIG. 6, as well as other forms of drivers and equalization structures. This flow chart assumes the output amplitude for the maximum frequency had previously been measured and stored in a memory element. A sample-and-hold circuit could be used for this purpose. The maximum frequency output amplitude is denoted $V_{fullrate}$. Furthermore, the replica driver of the invention is configured such that the driver is transmitting data for bit time >0. Referring to FIG. 3, D(0) will always be equal to D(−1) for this process.

In the process, the frequency division ratio N is first initialized to 1 in step 702. The steps after initialization comprise a loop where many data frequencies are applied via the frequency division ratio N. The first step 704 of the loop adds one to the frequency division ratio. Next, the division ratio is tested in step 706 to ensure N has not exceeded the maximum value of interest as defined by the system designer. If the maximum value of N has been exceeded, the loop and the process are exited at step 708. If the maximum value of N has not been exceeded, then the equalization power setting, denoted EQ(N), is set to its minimum value in step 710. The equalization power is the amount the driver output amplitude is reduced relative to the maximum output amplitude given no signal attenuation. For instance, the equalization power setting EQ(2) would be the value A denoted in FIG. 3 for a 2-tap FIR CML driver. The minimum value of A could be zero. In that case, the data at frequency $f_{max}/2$ would have the same output amplitude as the data at the maximum frequency, $f_{max}$, ignoring signal attenuation.

The process of FIG. 6 has a second loop for the current value of N, where the equalization power is set such that the amplitude for data frequency $f_{max}/N$ is reduced to the amplitude for data frequency $f_{max}$. In the first step in the second loop 712, the driver output amplitude at maximum frequency, $V_{fullrate}$, is compared to the voltage swing of low-frequency data, $V_{sig}$. If $V_{fullrate}$ is less than $V_{sig}$, the equalization power for division ratio N, set by EQ(N), is raised. The increase in equalization power is denoted in step 714 by the equation EQ(N)=EQ(N)+1. For instance, the value A of FIG. 3 is increased until $V_{fullrate}$ is greater than or equal to $V_{sig}$. The driver characteristics employed to lower the driver output amplitude could include the driver output stage biasing or the number of parallel current sources comprising the driver output stage current source for a CML driver. When $V_{sig}$ is no longer greater than $V_{fullrate}$, the second loop exits to the first loop at step 704, where N is increased and the process continues until all frequencies of interest have been applied and all corresponding equalization powers have been determined.

While preferred embodiments of the invention have been described herein, variations in the design may be made, and such variations may be apparent to those skilled in the art of data signal transmission communication system design. The embodiments identified above are by no means the only embodiments suitable for practicing the present invention, and substitute embodiments will be readily apparent to one skilled in the art. The scope of the invention, therefore, is only to be limited by the following claims.

What is claimed is:

1. A method for performing a high speed serial link in a computer network communication system, comprising the steps of:
   providing a data driver configured to receive a real data input and responsively generate a driver data output;
   providing a replica driver structure in circuit communication with the data driver;
   the replica driver receiving a calibration data input and responsively generating a replica driver output;
   providing a calibration engine in circuit communication with the data driver and the replica driver;
   providing a peak level detector in circuit communication with the replica driver and the calibration engine;
   the peak level detector generating a peak level detector output responsive to the replica driver output to the calibration engine; and
   the calibration engine comparing the peak level detector output to a reference value and responsively performing a data driver adjustment;
   wherein the data driver adjustment step comprises at least one of:
   (1)(a) adjusting a data driver biasing;
   (1)(b) adjusting a data driver intermediate stage bandwidth; and
   (1)(c) adjusting a data driver egualization setting;
   the replica driver further providing a replica pre-driver multiplexer (MUX) and a replica driver output stage, the replica pre-driver MUX in circuit communication with the calibration engine;
   the replica pre-driver MUX receiving the calibration data input from the calibration engine and responsively generating a replica MUX data output to the replica driver output stage;
   the replica driver output stage responsively generating a replica driver data output;
   providing a signal interface in circuit communication between the replica driver output stage and the peak level detector;
   the signal interface, generating a signal interface output signal to the peak level detector responsive to the replica driver data output, wherein the peak level detector is configured to generate the peak level detector output responsive to the signal interface output signal;
   the data driver further providing a data pre-driver MUX in circuit communication with the calibration engine;
   the data pre-driver MUX receiving the real data input and responsively generating a data pre-driver MUX data output;
   the data driver further providing an output stage in circuit communication with the calibration engine and the data pre-driver MUX; and
   the data driver output stage receiving the data pre-driver MUX data output and responsively generating a driver data output;
   wherein the calibration engine performs the driver component adjustment by generating a pre-driver/MUX adjustment signal to the data pre-driver MUX and the replica pre-driver MUX, and a driver adjustment signal to the data driver output stage and the replica driver output stage; and
   wherein the (1)(a) a data driver biasing adjustment step comprises the steps of:
   setting the replica driver output stage to a minimum output amplitude responsive to at least one driver aspect;
   setting an input to the replica driver output stage to a maximum frequency;
   comparing a replica driver output stage output amplitude $V_{sig}$ to a reference signal amplitude $V_{ref}$; and
   if $V_{sig}$ is less than $V_{ref}$, then increasing replica driver output stage power until $V_{sig}=V_{ref}$.

2. The method of claim 1, wherein the calibration engine comprises a comparator and a digital state machine, and the driver adjustment signal is configured to perform the (1)(a) a driver biasing adjustment through the following steps:
   measuring a replica driver output amplitude for a calibration data input sinusoid relative to a reference signal;
   the peak level detector detecting a reference signal peak value and a replica driver output peak amplitude for a calibration data input sinusoid;
   the comparator comparing the reference signal peak value and the replica driver output peak amplitude and responsively generating a comparison output to the digital state machine; and
   the digital state machine interpreting the comparison output and responsively performing the driver component adjustment.

3. The method of claim 2, wherein step of the digital state machine interpreting the comparison output further comprises the steps of:
   responsively adjusting the replica driver output stage until the reference signal and the replica driver output amplitude for a calibration data input sinusoid for a given frequency are the same; and
   applying the replica driver output stage adjustment to the driver output stage.

4. The method of claim 1, wherein the calibration engine is an operational amplifier, and the driver adjustment signal is configured to perform the (1)(a) a driver biasing adjustment through the following steps:
   the operational amplifier continuously comparing the peak level detector output to a required output level;
   the replica driver output stage bias value responsively changed by a bias circuit component; and
   applying the replica driver output stage adjustment to the driver output stage.

5. The method of claim 1, further comprising the step of the (1)(c) a driver equalization setting reducing $V_{sig}$ for low-frequency data responsive to the driver adjustment signal until a low-frequency data amplitude is the same as a maximum frequency data amplitude value.

6. The method of claim 5, configured to perform the driver equalization setting adjustment through the following steps:
   initializing a frequency division ratio N to 1;

adding one to N until N is greater than a maximum value of interest while $V_{sig}$ is $\leq$ a driver output stage amplitude at maximum frequency $V_{fullrate}$; and if N $\leq$ a maximum value of interest, then setting an equalization power EQ(N) to a minimum value, wherein EQ(N) is an amount of driver output stage amplitude reduction relative to a maximum output amplitude given no signal attenuation.

7. The method of claim 6, configured to perform the driver equalization setting adjustment through the additional following process steps:

comparing $V_{fullrate}$ to $V_{sig}$; and if $V_{fullrate}$ is less than $V_{sig}$, setting an equalization power EQ(N)=EQ(N)+1.

* * * * *